US012783870B2

(12) United States Patent
Sun

(10) Patent No.: US 12,783,870 B2
(45) Date of Patent: Nov. 3, 2026

(54) METHODS AND SYSTEMS FOR AN ONLINE MACHINE-LEARNED NON-LINEAR BEAMFORMING TUPLE SOLVER

(71) Applicant: SAUDI ARABIAN OIL COMPANY, Dhahran (SA)

(72) Inventor: Yimin Sun, The Hague (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1327 days.

(21) Appl. No.: 17/648,271

(22) Filed: Jan. 18, 2022

(65) Prior Publication Data

US 2023/0229908 A1 Jul. 20, 2023

(51) Int. Cl.
*G06N 3/08* (2023.01)
*G06N 3/048* (2023.01)

(52) U.S. Cl.
CPC ............... *G06N 3/08* (2013.01); *G06N 3/048* (2023.01)

(58) Field of Classification Search
CPC ........... G06N 3/08; G06N 3/048; G06N 3/045
See application file for complete search history.

(56) References Cited

U.S. PATENT DOCUMENTS

| | | | | |
|---|---|---|---|---|
| 11,009,617 B2 * | 5/2021 | Gadylshin | G01V 1/307 |
| 11,694,115 B2 * | 7/2023 | Kazemi | G06N 3/086 706/12 |
| 2015/0113379 A1 * | 4/2015 | Wakefield | G06F 30/20 715/227 |
| 2016/0187513 A1 | 6/2016 | Poole et al. | |
| 2019/0302290 A1 | 10/2019 | Alwon | |
| 2020/0264327 A1 * | 8/2020 | Gadylshin | G06T 5/60 |
| 2021/0041596 A1 | 2/2021 | Kushwaha et al. | |
| 2022/0260740 A1 * | 8/2022 | Bakulin | G01V 1/30 |
| 2022/0260742 A1 * | 8/2022 | Bakulin | G01V 1/362 |

FOREIGN PATENT DOCUMENTS

WO 2021020982 A1 2/2021

OTHER PUBLICATIONS

Bakulin et al.; "Nonlinear beamforming for enhancing prestack seismic data with a challenging near surface or overburden", First Break; vol. 36; Issue 12; Dec. 1, 2018; pp. 121-126 (6 pages).
Office Action issued in Saudi Arabian Application No. 123441077, mailed on Apr. 28, 2025 (10 pages).

* cited by examiner

*Primary Examiner* — Manuel A Rivera Vargas
(74) *Attorney, Agent, or Firm* — Osha Bergman Watanabe & Burton LLP

(57) ABSTRACT

A method for determining a non-linear beamforming (NLBF) tuple is disclosed. The method includes receiving a seismic data set and discretizing the seismic data set into a plurality of NLBF sub-problems. The method includes solving a subset of the NLBF sub-problems with a non-linear optimizer to create final NLBF tuples. The method further includes periodically training a machine-learned model with a subset of the NLBF sub-problems and final NLBF tuples data and obtaining intermediate NLBF tuple predictions from the trained machine-learned model. The intermediate NLBF tuple predictions may be used as initial values in a non-linear optimizer to create final NLBF tuples or may be accepted as final NLBF tuples. The method includes storing the final NLBF tuples.

20 Claims, 7 Drawing Sheets

METHODS AND SYSTEMS FOR AN ONLINE MACHINE-LEARNED NON-LINEAR BEAMFORMING TUPLE SOLVER

BACKGROUND

Seismic surveys are frequently conducted by participants in the oil and gas industry. Seismic surveys are conducted over subterranean regions of interest during the search for, and characterization of, hydrocarbon reservoirs. In seismic surveys, a seismic source generates seismic waves which propagate through the subterranean region of interest and are detected by seismic receivers. Typically, both seismic sources and seismic receivers are located on the surface of the earth. The seismic receivers detect and store a time-series of samples of earth motion caused by the seismic waves. The collection of time-series of samples recorded at many seismic receiver locations generated by a seismic source at many source locations constitutes a seismic data set.

Once acquired, a seismic data set may undergo a myriad of processing steps. The purposes of these processing steps include, but are not limited to, reducing signal noise, identifying subterranean structures and surfaces, and data visualization.

One such processing technique is non-linear beamforming (NLBF) which comprises the summation of time-shifted seismic data across multiple seismic receivers. The time-shift is determined by a so-called move-out function. The mov-out function is typically a parameterized second-order function. The move-out function parameters may be determined for various spatial and temporal sub-regions. That is, the move-out function parameters may change for different groupings of seismic receivers and at different times.

The spatial and temporal sub-regions are determined by discretizing the seismic data set according to a user. It is not uncommon for a single seismic data set to be discretized into millions, if not hundreds of millions, of spatial and temporal sub-regions. Again, it is emphasized that the move-out function parameters are determined for each sub-region. Because the move-out function parameters are determined for each sub-region, the process of determining the move-out function parameters for a single sub-region is referred to as a "NLBF sub-problem".

Generally, the move-out function parameters for a single spatial and temporal sub-region of the seismic data set are determined by optimizing an objective function. In other words, an NLBF sub-problem is solved by optimizing an objective function. The objective function may be a semblance-like function wherein greater values of this objective function correspond to increased coherence among the time-series data collected over multiple seismic receivers. Typically, the optimization of the objective function is performed by a non-liner optimizer.

A commonly used non-linear optimizer is the genetic algorithm. The genetic algorithm systematically computes many combinations of the move-out function parameters to optimize the objective function. As such, solving an NLBF sub-problem consists of computing the objective function a large number of times according to the genetic algorithm. Consequently, solving all the NLBF sub-problems is computationally expensive.

The determined move-out function parameters, and any other relevant information, such as the value of the objective function, are grouped together to form an NLBF tuple. That is, there exists an NLBF tuple, composed of at least one value, for each solved NLBF sub-problem.

Once all NLBF sub-problems have been solved, the NLBF tuples are used in accordance with the move-out function to calculate the appropriate time shifts of the seismic data set. Using the locally time-shifted data, the time-series data is summed over local regions of the seismic data set and the non-linear beamforming (NLBF) procedure is complete. The seismic data set may be further processed and used for additional tasks such as visualization.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for determining a non-linear beamforming (NLBF) tuple. The method includes receiving a seismic data set and discretizing the seismic data set into a plurality of NLBF sub-problems. The method includes solving a subset of the NLBF sub-problems with a non-linear optimizer to create final NLBF tuples. The method further includes periodically training a machine-learned model with a subset of the NLBF sub-problems and final NLBF tuples data and obtaining intermediate NLBF tuple predictions from the trained machine-learned model. The intermediate NLBF tuple predictions may be used as initial values in a non-linear optimizer to create final NLBF tuples or may be accepted as final NLBF tuples. The method includes storing the final NLBF tuples.

In general, in one aspect, embodiments relate to a non-transitory computer readable medium storing instructions executable by a compute processor. The instructions include functionality for determining a non-linear beamforming (NLBF) tuple. The instructions include the functionality for receiving a seismic data set and discretizing the seismic data set into a plurality of NLBF sub-problems. The instructions further include functionality for solving a subset of the NLBF sub-problems with a non-linear optimizer to create final NLBF tuples. The instructions still further include functionality for periodically training a machine-learned model with a subset of the NLBF sub-problems and final NLBF tuples data and obtaining intermediate NLBF tuple predictions from the trained machine-learned model. The intermediate NLBF tuple predictions may be used as initial values in a non-linear optimizer to create final NLBF tuples or may be accepted as final NLBF tuples, again, with functionality provided by instructions stored executed by a computer processor. The instructions include functionality for storing the final NLBF tuples.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed describe methods and systems that assist in the determination of non-linear beamforming (NLBF) tuples from seismic data. The assistance is provided by a machine-learned model with online capabilities. In this context, the term "online" refers to the fact that the machine-learned model may be trained, or re-trained periodically, "on-the-fly", or in "real-time", as training data is continuously acquired. In accordance with one or more embodiments, and as described in greater detail later, the periodicity of re-training may be performed at a given frequency.

Figure 1:
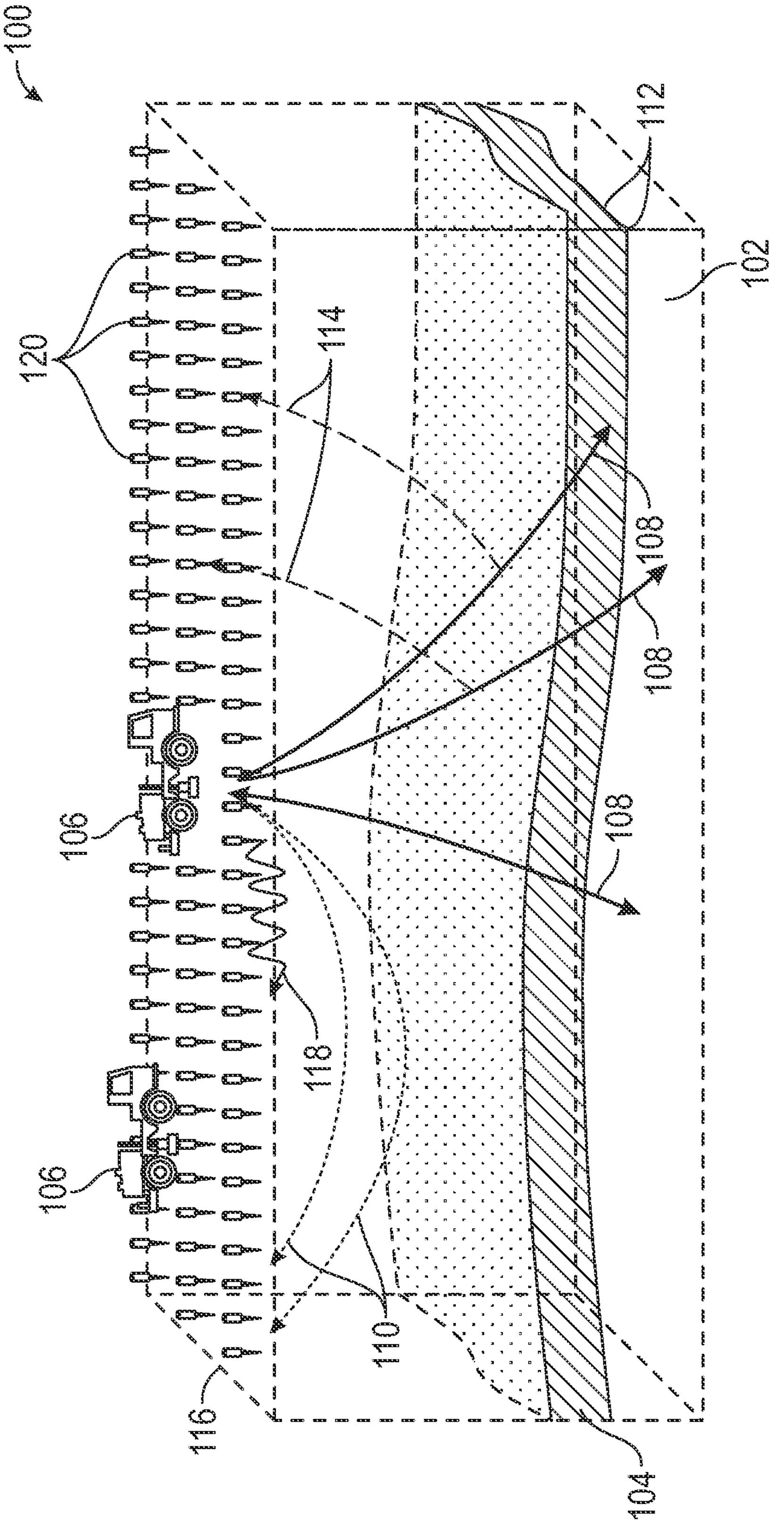
FIG. 1 depicts a seismic survey in accordance with one or more embodiments.

FIG. 1 shows a seismic survey (100) of a subterranean region of interest (102), which may contain a hydrocarbon reservoir (104). In some cases, the subterranean region of interest (102) may lie beneath a lake, sea, or ocean. In other cases, the subterranean region of interest (102) may lie beneath an area of dry land. The seismic survey (100) may utilize a seismic source (106) that generates radiated seismic waves (108). The type of seismic source (106) may depend on the environment in which it is used, for example on land the seismic source (106) may be a vibroseis truck or an explosive charge, but in water the seismic source (106) may be an airgun. The radiated seismic waves (108) may return to the surface of the earth (116) as refracted seismic waves (110) or may be reflected by geological discontinuities (112) and return to the surface as reflected seismic waves (114). The radiated seismic waves may propagate along the surface as Rayleigh waves or Love waves, collectively known as "ground-roll" (118). Vibrations associated with ground-roll (118) do not penetrate far beneath the surface of the earth (116) and hence are not influenced, nor contain information about, portions of the subterranean region of interest (102) where hydrocarbon reservoirs (104) are typically located. Seismic receivers (120) located on or near the surface of the earth (116) detect reflected seismic waves (114), refracted seismic waves (110) and ground-roll (118).

In accordance with one or more embodiments, the refracted seismic waves (110), reflected seismic waves (114), and ground-roll (118) generated by a single activation of the seismic source (106) are recorded by a seismic receiver (120) as a time-series representing the amplitude of ground-motion at a sequence of discreet sample times. Usually the origin of the time-series, denoted t=0, is determined by the activation time of the seismic source (106). This time-series may be denoted a seismic "trace". The seismic receivers (120) are positioned at a plurality of seismic receiver locations which we may denote ($x_r$, $y_r$) where x and y represent orthogonal axes on the surface of the earth (116) above the subterranean region of interest (102). Thus, the plurality of seismic traces generated by activations of the seismic source (106) at a single location may be represented as a three-dimensional "3D" volume with axes ($x_r$, $y_r$, t) where ($x_r$, $y_r$) represents the location of the seismic receiver (120) and t denotes the time sample at which the amplitude of ground-motion was measured. The collection of seismic traces is herein referred to as the seismic data set.

However, a seismic survey (100) may include recordings of seismic waves generated by a seismic source (106) sequentially activated at a plurality of seismic source locations denoted ($x_s$, $y_s$). In some cases, a single seismic source (106) may be activated sequentially at each source location. In other cases, a plurality of seismic sources (106) each positioned at a different location may be activated sequentially. In accordance with one or more embodiments a plurality of seismic sources (106) may be activated during the same time period, or during overlapping time periods.

Once acquired, a seismic data set may undergo a myriad of processing steps. The purposes of these processing steps include, but are not limited to, reducing signal noise, identifying subterranean structures and surfaces, and data visualization. For simplicity and ease of visualization, FIG. 2 partially displays an example of a generic 2D seismic data set (200). The seismic data set (200) is 2D because, in this example, the seismic receivers (120) are placed in a single line on the surface, and time, containing information about the depth of subsurface reflectors, is displayed orthogonal to it. However, while FIG. 2 demonstrates a 2D seismic data set (200), this does not constitute a constraint on the dimensionality of a seismic data set (200). In general, a seismic data set may be 2D or 3D without departing from the scope of this disclosure.

Once processed, the seismic data set (200) forms a seismic image. The seismic image, which contains information to characterize and locate hydrocarbon reservoirs, may be used to plan and drill a wellbore to extract said hydrocarbons.

Figure 2:
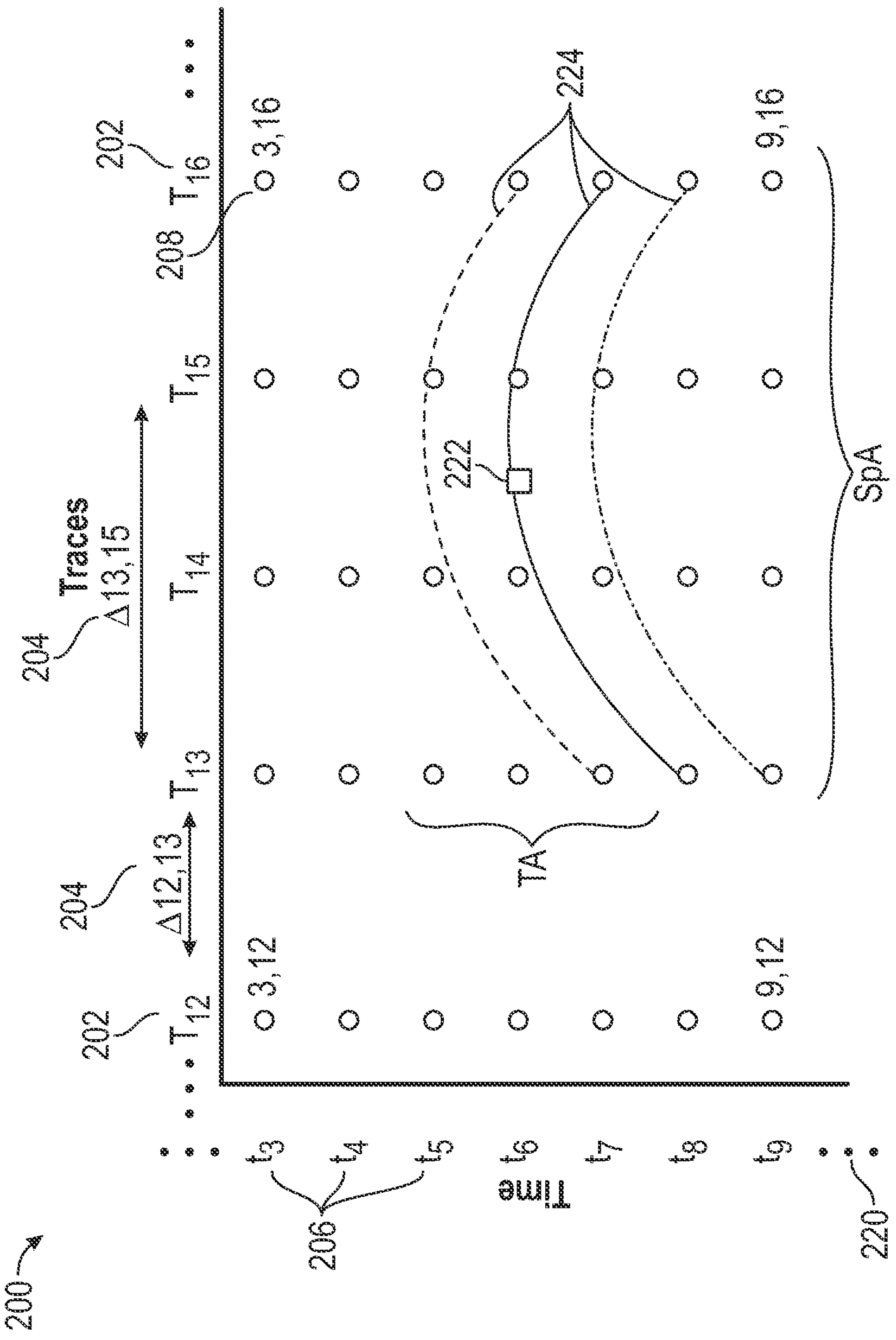
FIG. 2 shows portions of seismic dataset in accordance with one or more embodiments.

As noted, the seismic data set (200) is composed of a collection of traces (202) where each trace represents the amplitude of the signal recorded by an associated seismic receiver (120). The spatial distances (204) between each trace, which correspond to the spatial distances (204) between each seismic receiver (120) are known. Only a select few spatial distances (204) are shown in FIG. 2 for brevity. Each trace (202) contains a time series of amplitude values at sample or recorded times (206). The amplitude values are hereafter referred to as seismic data points (208) and are represented by the symbol (○) in FIG. 2. For clarity, only select seismic data points (208) are subscripted according to their associated time (206) and trace (202), however, each seismic data point (208) does have an implicit subscript. For example, $o_{3,16}$ is the seismic data point (208), or signal value, of trace (202) 16 at time (206) 3. Additionally, FIG. 2. should be considered as a window into the entire seismic data set (200), and is not inclusive of every value in a seismic data set (200), as indicated by the arbitrary trace (202) subscripts, arbitrary time (206) subscripts, and ellipses (220).

Figure 3:
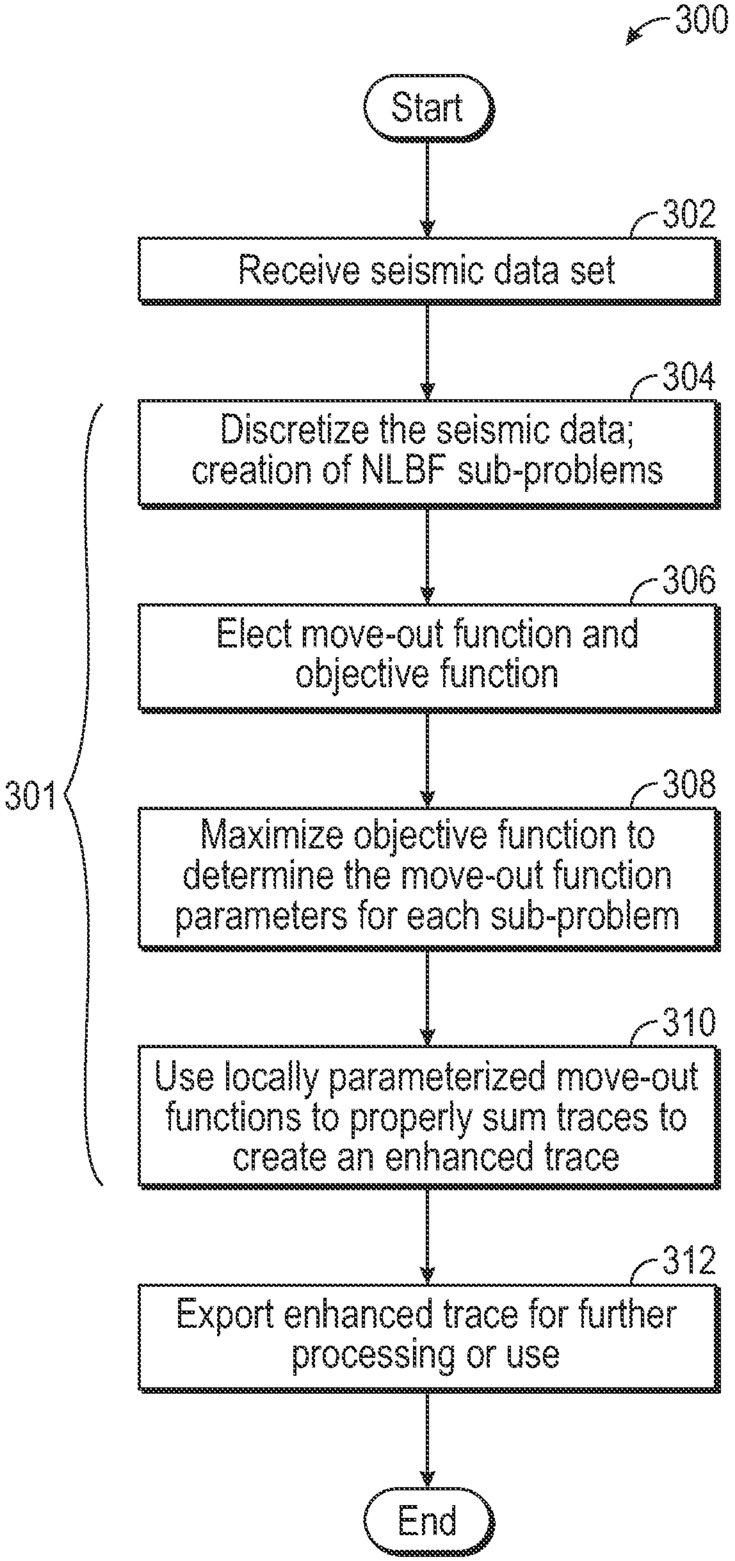
FIG. 3 shows a flowchart of the nonlinear beamforming procedure in accordance with one or more embodiments.

One processing technique that may be applied to a seismic data set (200) is non-linear beamforming (NLBF). FIG. 3 provides a general, high-level overview of the steps which may be taken during, and surrounding, an NLBF procedure. As shown, the first step is the acquisition (302) of the seismic data set (200). Typically, the seismic data is discretized (304), both temporally and spatially. The discretization (304) splits the seismic data set (200) into sub-regions, which may be overlapping, disjoint, or exclusive. Each sub-region creates one "NLBF sub-problem" to be solved. Greater description about the NLBF sub-problem is provided later. Additionally, the NLBF procedure requires that a "move-out function" and "objective function" are defined (306). Again, greater detail regarding the move-out function and objective function will be provided hereafter. For each sub-problem, a set of move-out function parameters are determined such that an extremum of the objective function is reached (308). The extremum may be a maximum or a minimum, depending on the design of the objective function. Using the move-out function parameters for each sub-region, the traces (202) are summed accordingly to create an enhanced trace. They enhanced trace may be exported for further processing or use (312). Thus, the general NLBF procedure (301) comprises the steps from discretization (304) to the creation of the enhanced trace (310).

Each step of the NLBF procedure (301) is further described. As seen in FIG. 3, spatial and temporal sub-regions are determined by discretizing (304) the seismic data set (200) according to a user. It is not uncommon for a single seismic data set (200) to be discretized into millions, if not hundreds of millions, of spatial and temporal sub-regions. Here, it is emphasized that the move-out function parameters are determined for each sub-region. Because the move-out function parameters are determined for each sub-region, the process of determining the move-out function parameters for a single sub-region is referred to as an "NLBF sub-problem". Thus, the discretization (304) of the seismic data set (200, 402) creates millions, if not hundreds of millions, of NLBF sub-problems (304).

Borrowing terms frequently found in the literature, optimization of a function refers to discovering the set of parameters that result in said function obtaining either its maximum or minimum possible value, or a locally maximum or minimum value. Typically, functions that are intended to be minimized are known as "cost" functions or "loss" functions. Likewise, the term "objective" function is often used to describe functions that are intended to be maximized or minimized; although additional names are encountered in the literature. One skilled in the art will appreciate that minimization and maximization can be made equivalent through simple techniques, like negation, such that the use of one term, such as objective function, does not preclude the others. That is, while the term objective function is used herein for consistency, it is non-limiting.

Advancing to the election of the objective function (306), in one embodiment, the objective function may be a semblance-like function $$S(x_0, y_0, t_0) = \frac{\sum_{j\in TA}\left[\sum_{(x,y)\in SpA} u(x, y, t_j + \Delta t(x, y; x_0, y_0, t_0))\right]^2}{N_{SpA}\sum_{j\in TA}\left[\sum_{(x,y)\in SpA} u(x, y, t_j + \Delta t(x, y; x_0, y_0, t_0))^2\right]}, \qquad (1)$$

wherein greater values of this objective function correspond to increased coherence among the time-series data, or traces (202), collected over multiple seismic receivers (120).

In EQ. 1, u(x, y, t) references the value of the trace (202) collected by a seismic receiver (120) located at position x, y at time t. The inner summation acts on time-shifted values u where x, y are located in a so-called "Spatial Aperture" (SpA). Likewise, the outer summation operates over a "Temporal Aperture" (TA) to account for additional points in time. $N_{SpA}$ is the number of traces (202) contained in the Spatial Aperture (SpA). Additionally, ($x_0$, $y_0$, $t_0$) in EQ. 1 reference a local origin point (222) which will be described in greater detail on continuation. Note that EQ. 1 is readily applicable to a 3D data set but may be reduced to operate on a 2D seismic data set (200) or extended to higher dimensions.

The time-shift Δt used in EQ 1. is the move-out function. In one embodiment the move-out function is a parameterized second-order function:

$$\Delta t(x, y; x_0, y_0, t_0) = A\Delta x + B\Delta y + C\Delta x\Delta y + D\Delta x^2 + E\Delta y^2, \qquad (2)$$

where A, B, C, D and E are unknown parameters of the move-out function, $\Delta x = x - x_0$, $\Delta y = y - y_0$, and $t_0$ is listed as given to emphasize that the move-out function is applied to many temporal sub-regions. Concretely, Δx and Δy represent the spatial distance between traces (202) located at positions (x, y) and ($x_0$, $y_0$), along their respective axes, and are analogous to the generic spatial distance Δ (204) seen in FIG. 2. Again, EQ. 2 operates in two dimensions but may be readily adjusted for use in one dimension, for example, to be used with the seismic data set (200) of FIG. 2, or higher dimensions. In other embodiments, EQ. 2 may be a first-order function or a higher-order function such as a third-order function. Alterations of this nature may reduce or increase the number of unknown parameters in the move-out function.

Because EQ. 2 is continuous valued and the seismic data points (208), as referenced by u(x, y, t), are discrete, the substitution of EQ. 2 into EQ. 1 may result in a term u(x, y, $t_j$+Δt) wherein ($t_j$+Δt) does not correspond to an actual time (206) present in the seismic data set (200). Here, it is noted that the functional dependence of Δt on x, y, $x_0$, $y_0$, and $t_0$ is omitted for brevity and without ambiguity. In this case, one skilled in the art will acknowledge that a value u may be obtained at an arbitrary time ($t_j$+Δt) by interpolative methods; including simply using the value of u(x, y, t) where t is the time (206) actually present in the seismic data set (200) nearest to ($t_j$+Δt).

At this point, it is expedient to introduce some nomenclature to be used throughout this document. Namely, when a model or function is characterized by a set of coefficients, these coefficients are known as the "parameters" of said function or model—such as the parameters A, B, C, D and E of the move-out function of EQ. 2. If the model, function, or procedure has additional attributes that control its behavior, these attributes are referred to as "hyperparameters". As such, the exact discretization (304) of the seismic data set (200), the choice of move-out function and objective function (306), the method of maximizing the objective function (308), and the Spatial Aperture (SpA) and Temporal Aperture (TA) in EQ. 1 are examples of hyperparameters because they define the implementation of the NLBF procedure (301).

Generally, the move-out function parameters for a single NLBF sub-problem are determined by optimizing an objective function (308). For example, using the objective function and move-out function of equations 1 and 2, respectively, an NLBF sub-problem is solved by discovering the move-out function parameters A, B, C, D and E that maximize EQ 1. Again, it is emphasized, that the move-out function parameters will be determined for each NLBF sub-problem as determined by the discretization (304) of the seismic data set (200). That is, the move-out function parameters may change for different groupings of seismic receivers (120) and at different times (206).

FIG. 2. will provide a concrete example into the inner workings of EQ. 1. FIG. 2 shows the location of a local origin point (222) which is $u(x_0, y_0, t_0)$ in EQ 1. The location of a local origin point (222) is arbitrary and need not coincide with any seismic data point (208) in the seismic data set (200) spatially or temporally. As described, the seismic data set (200) is discretized (304) according to user-defined hyperparameters to create many NLBF sub-problems. Each NLBF sub-problem consists of maximizing an objective function, such as EQ. 3. As such, implicit to the definition of EQ. 3, there is one local origin point (222) for each NLBF-subproblem. In fact, the task of discretization (304) comprises choosing one or more local origin points (222) to span the domain of the seismic data set (200). It is also noted that the Spatial Aperture (SpA) and Temporal Aperture (TA) are likely chosen to encompass the local origin point (222) for each NLBF sub-problem, however, this is not a requirement.

An arbitrary second-order move-out surface (224), with various time-shifts over a Temporal Aperture (TA), and spanning a Spatial Aperture (SpA) is also shown in FIG. 2. Again, as a hyperparameter governing the NLBF procedure (301), the seismic data points (208) encompassed by the Spatial Aperture (SpA) and Temporal Aperture (TA) for a given NLBF sub-problem are defined by the user, likely during the discretization process. In other words, the Temporal Aperture (TA) and Spatial Aperture (SpA) illustrated in FIG. 2 are given only by means of example.

Using FIG. 2 as an example, wherein the location, spatially and temporally, of a local origin point (222) and the Spatial Aperture (SpA), Temporal Aperture (TA), and proposed move-out surface (224) are shown, EQ. 1 can be written out as follows:

$$S(x_0, y_0, t_0) = \frac{(\circ_{7,13}+\circ_{5,14}+\circ_{5,15}+\circ_{6,16})^2+(\circ_{8,13}+\circ_{6,14}+\circ_{6,15}+\circ_{7,16})^2+(\circ_{8,13}+\circ_{7,14}+\circ_{7,15}+\circ_{8,16})^2}{4\left(\circ_{7,13}^2+\circ_{5,14}^2+\circ_{5,15}^2\ \circ_{6,16}^2+\circ_{8,13}^2+\circ_{6,14}^2+\circ_{6,15}^2+\circ_{7,16}^2+\circ_{8,13}^2+\circ_{7,14}^2+\circ_{7,15}^2+\circ_{9,16}^2\right)}, \quad (3)$$

assuming ($t_j+\Delta t$) is simply coerced to the nearest time (206) t present in the seismic data set (200) when evaluating $u(x, y, t_j+\Delta t)$. Again, the method of obtaining a value u at arbitrary times ($t_j+\Delta t$) is defined by the user and may be interpolative in nature.

It is emphasized that EQ 3. is provided only as an example and is only relevant to one parameterization of the move-out surface (224) for a single NLBF sub-problem as displayed in FIG. 2. Recall that the ○ symbol is a placeholder for the numerical values that would be contained in an actual seismic data set (200).

In the presently discussed case, where the objective function is a semblance-like function and the move-out function is a second-order function, the objective function is non-convex. Therefore, in order to determine the move-out function parameters the objective function is optimized using a non-linear optimizer capable of both exploration and exploitation of the objective function's domain.

A commonly used non-linear optimizer is the genetic algorithm (GA). An overview of the typical steps used in the genetic algorithm (GA) is provided in FIG. 4. The genetic algorithm (400) begins by generating an initial population or multiple populations (402). A population consists of one or more "individuals". In the context of the genetic algorithm (400), an individual is a single representation, or encoding, of the function parameters over which optimization is to occur. For example, if the function used is the move-out function of EQ. 2, then the parameters are A, B, C, D and E. In this case, an individual is the assignment of values to each parameter while respecting any imposed constraints. One individual may be {A=1.05, B=2, C=6.3, D=—2, E=1}, while another individual may be {A=4, B=−2, C=12.9, D=1.32, E=−3}. The number of individuals in a population, and the method of initially generating individuals, are hyperparameters chosen by the user. When multiple populations are used, commonly referred to as an "island" scheme, the populations need not be initialized using the same set of hyperparameters.

Once a population(s) has been generated (402), the "fitness" of every individual in the population(s) is evaluated (404). In the context of the move-out and objective functions defined by equations 2 and 1, respectively, the parameter values of an individual are used in the move-out function and subsequently propagated through the objective function, producing an output. Because the objective function of EQ 1 is defined to be maximized, individuals that result in higher outputs are considered "more fit".

Next, a stopping criterion is checked (406). Many stopping criteria exist, including, but not limited to, the number of iterations the genetic algorithm has run, the maximum or minimum fitness score achieved by an individual, the relative change in fitness scores between iterations, and the similarity of individuals in a population, or combinations of these criteria. If the algorithm is to stop, typically, the most fit individual(s) seen during the genetic algorithm process is selected (412) and the algorithm terminates. Likewise, if the genetic algorithm continues, one or more individuals from the population(s) are selected (408). This selection may be done by simply selecting the portion of the population with the highest fitness scores, or through a tournament process, or other selection mechanism.

Once individuals have been selected (408), the individuals may be propagated through without alteration, removed, or altered through so-called crossover, mutation, and differential evolution methods to create "offspring" (410). The offspring are themselves individuals; that is, new representations, or encodings, of the function parameters. It is noted that many evolutionary methods exist to create offspring and the preceding list is not all-inclusive and should be considered non-limiting. The offspring are then evaluated for fitness (404) and the process is repeated until the genetic algorithm stopping criterion is met.

Figure 4:
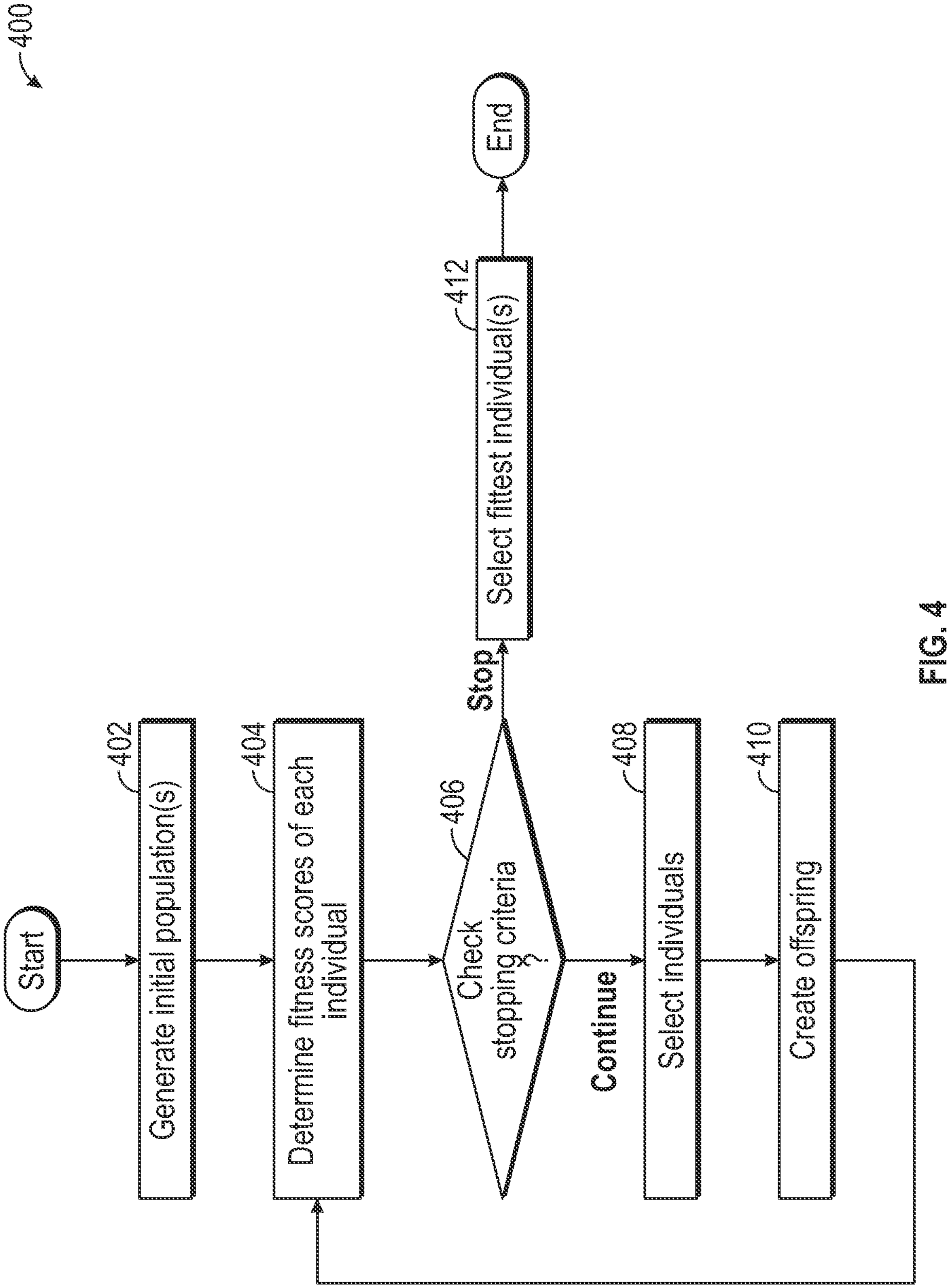
FIG. 4 shows a flowchart of a generic genetic algorithm in accordance with one or more embodiments.

Again, the description of the genetic algorithm (GA) provided in FIG. 4 is generalized and one skilled in the art will appreciate that many modifications can be made, and are regularly made, to the genetic algorithm (GA) without departing from its intended scope. For example, an enhanced genetic algorithm (eGA) is developed by including additional features such as: enforcing deliberately diverse initial populations; using heterogenous hyperparameters for each population; dynamically updating or scheduling changes to the selection process and offspring creation process; using a unidirectional migration policy between populations; adding additional checks, such as a premature convergence check; using a self-adaptive differential evolution method; performing a localized exhaustive search in regions of stagnation or saturation.

Other non-linear optimizers may be employed to maximize the objective function and determine the move-out function parameters (308). The non-linear optimizer could be a Bayesian-based optimizer which elects new parameters based on an analysis of the updated posterior distribution. In this context, the level of exploration and exploitation would be determined by the user.

As shown in FIG. 3, the product of the NLBF procedure (301) generates an enhanced trace via a summation (310). The summation is comprised of time-shifted seismic data across multiple seismic receivers (120) and is typically of the form $$u(x_0, y_0, t_0) = \sum_{(x,y)\in SA} w(x, y, t_0)u(x, y, t_0 + \Delta t(x, y; x_0, y_0, t_0)), \quad (3)$$

where u is the seismic data point (208) from a seismic receiver (120) located at position x and y, and at time t, w is the beamforming weights, and Δt is the move-out function.

Note that EQ. 3 is readily applicable to a 3D data set but may be reduced to operate on a 2D seismic data set (200) or extended to higher dimensions. Additionally, while the beamforming weights w are listed as function of position, they are more likely a function of relative position Δx, Δy, where $\Delta x=x-x_0$ and $\Delta y=y-y_0$, respectively, in practical situations. The beamforming weights w may be chosen in many ways to enhance the signal and suppress noise.

The summation in EQ. 3 is taken over all traces (202) with positions (x, y) contained within the "Summation Aperture" (SA), which is typically a local region surrounding ($x_0$, $y_0$, $t_0$).

Thus, once all NLBF sub-problems have been solved, the move-out function parameters, which maximize the objective function for each sub-region, are used in accordance with the move-out function to calculate the appropriate time shifts of the seismic data set (200). Using local time-shifts, an enhanced trace is produced via the summation of EQ. 3 (310). The enhanced trace may be used immediately, exported, or further processed (312).

As shown, the genetic algorithm (400) systematically computes many combinations of the move-out function parameters to optimize the objective function. That is, many individuals are created and evaluated according to the objective function. As such, solving a single NLBF sub-problem consists of computing the objective function a large number of times. Consequently, solving all the NLBF sub-problems is computationally expensive and time-consuming, if not prohibitive.

There are two immediate ways to lower the computational cost of the NLBF procedure (301): by reducing the number of sub-problems (304) or by accelerating—even circumventing—the maximization of the objective function (308). While reducing the number of NLBF sub-problems decreases the computational cost, it also reduces the quality of the enhanced trace. In one or more of the embodiments disclosed herein, machine learning is used to assist in the maximization of the objective function.

Machine learning, broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein, however, one skilled in the art will recognize that the concepts and methods detailed hereafter are not limited by this choice of nomenclature.

Figure 5:
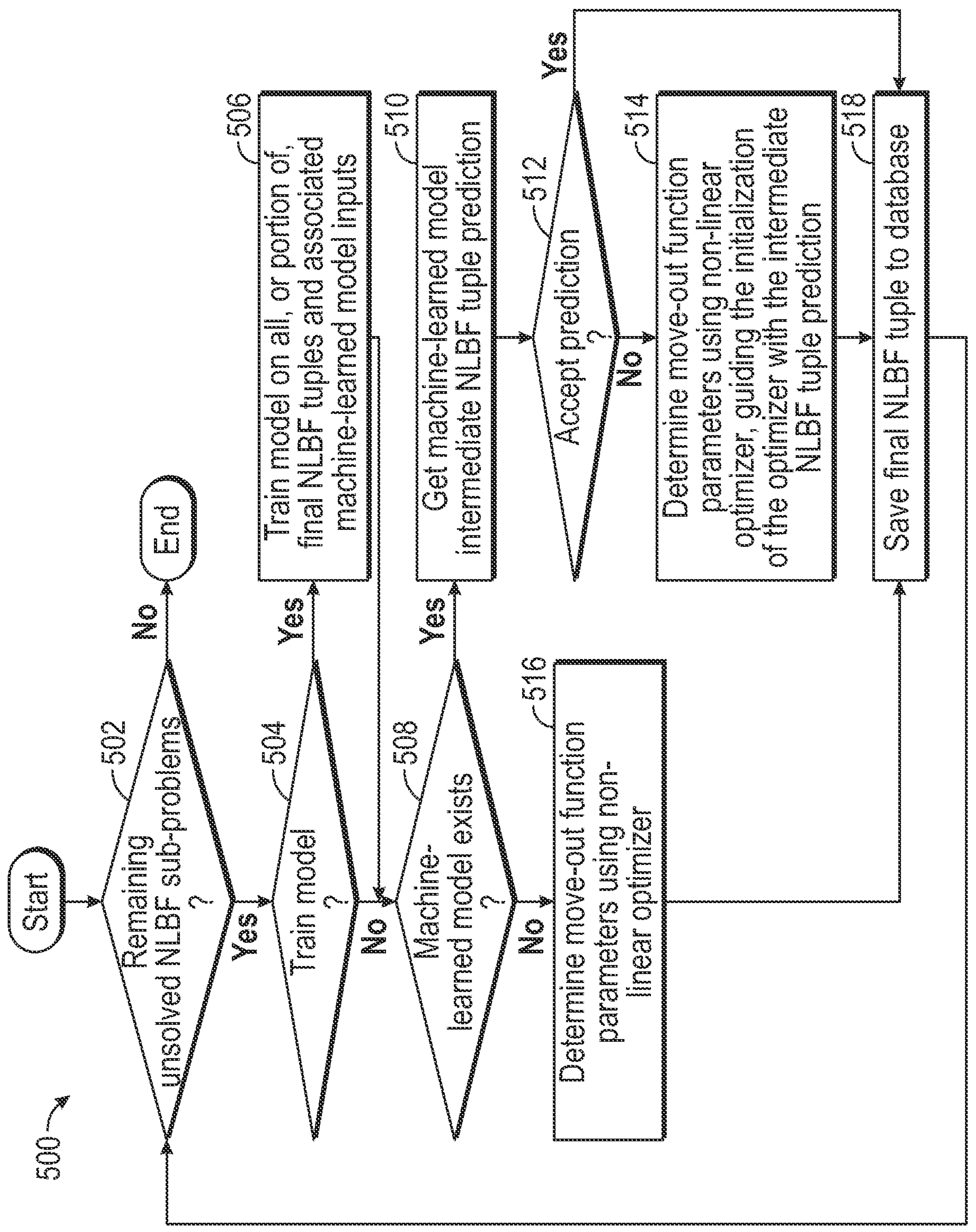
FIG. 5 depicts a flowchart of the processes and implementation of a machine-learned tuple solver in accordance with one or more embodiments.

In one or more embodiments, a machine-learned model is used to assist the maximization of the objective function (308) as depicted in FIG. 5. The process of FIG. 5 may directly replace block 308 in FIG. 3, such that the START of FIG. 5 is connected to block 306 of FIG. 3 and the END of FIG. 5 is connected to block 310 of FIG. 3. In block 502, the process checks if there are any NLBF sub-problems for which the move-out function parameters have yet to be determined. If all NLBF sub-problems have been solved, then, as previously mentioned, an enhanced trace can be created (310). If at least one NLBF sub-problem remains unsolved, block 504 checks if a machine-learned model should be trained. The decision to train a model may be determined by a scheduler or by a dynamic analysis of the machine-learned model's performance. For example, using a scheduler, the machine-learned model could be trained every time the move-out function parameters for 5000 NLBF sub-problems have been determined. In other words, the frequency of re-training would be once every 5000 NLBF sub-problems. It is emphasized that block 504, which relates to training a model, is contained in a loop as depicted in FIG. 5, such that the training is performed periodically, endowing the model with "online" capabilities.

To train a machine-learned model, a set of machine-learned model inputs and associated machine-learned model targets is required. Here, a single machine-learned model input is the seismic data points (208) contained within the Temporal Aperture (TA) and Spatial Aperture (SpA) defined by the NLBF sub-problem. Likewise, the associated machine-learned target is the determined move-out function parameters, and any other relevant information, such as the value of the objective function, for the same NLBF sub-problem. The machine-learned targets of a single NLBF sub-problem form a grouping hereafter referred to as a "final" NLBF tuple. For clarity, the use of the term "final" in describing some NLBF tuples is to further distinguish these NLBF tuples from those output, or predicted, by the machine-learned model. NLBF tuples output, or predicted, by the machine-learned model will be referred to as "intermediate" NLBF tuple predictions.

By means of example, if the move-out function takes the form of EQ. 2 and the objective function takes the form of EQ. 1, then the NLBF tuple is the set {A, B, C, D, E, S}. Therefore, each NLBF sub-problem has an associated machine-learned model input, and once solved, either by a non-linear optimizer like the genetic algorithm (GA) or by a machine-learned model, an NLBF tuple.

Returning to block 504, if the machine-learned model is to be trained, the set of NLBF sub-problems that have been solved, or a subset of these solved NLBF sub-problems, is used to train the machine-learned model as in block 506. The training procedure is provided access to the final NLBF tuples and the associated machine-leaned model inputs wherein the combination of the all current final NLBF tuples and the associated machine-learned model inputs is known as the "training data". In one or more embodiments, access to the training data is facilitated by a connection to the database referenced in block 518. Common training techniques, such as validation and early stopping, as well as other hyperparameters like regularization and batch normalization, may be used during training without departing from the scope of this embodiment. In one or more embodiments, when a machine-learned model is to be trained after the machine-learned model was already previously trained, the current training is initiated using the edge values of the latest previously trained model. The concept of edge values, along with the training procedure, will be described in greater detail later in this document. Training a machine-learned model using information from a previously trained machine-learned model can be thought of as "re-training" the machine-learned model.

After training, or if no training is required, block 508 checks if a trained machine-learned model exists. If so, in block 510 the trained machine-learned model outputs an intermediate NLBF tuple prediction. Acceptance of the intermediate NLBF tuple prediction is determined in block 512. The condition(s) for acceptance are determined by the user and may include, but are not limited to: the acceptance of all intermediate NLBF tuple predictions; rejection all intermediate NLBF tuple predictions; acceptance based on a comparison of the predicted objective function value and the actual objective function value when using the predicted move-out function parameters.

If the machine-learned model intermediate NLBF tuple prediction is accepted, it is saved to a database containing the results of all final NLBF sub-problems in block 518. In other words, if accepted an intermediate NLBF tuple prediction is simply considered a final NLBF tuple. If the machine learned model intermediate NLBF tuple prediction is not accepted, the intermediate NLBF tuple prediction is used to initialize a non-linear optimizer, such as the genetic algorithm (GA), in block 514 and the subsequent result is stored in the database of completed final NLBF sub-problems as shown in block 518.

Reverting to block 508, if a machine-learned model does not yet exist, or has not yet been trained, the move-out function parameters are determined using a non-linear optimizer, such as the genetic algorithm (GA), as shown in block 516, and the resulting move-out function parameters are stored in the database of completed final NLBF sub-problems in block 518. It is noted that the database of block 518 can be any memory storage device, such as a file system, binary blob, and database, and may be external or internal to the computational device. The database of block 518 may contain the machine-learned model inputs, or a reference to said inputs, in addition to the final NLBF tuples of the solved NLBF sub-problems.

Once all NLBF sub-problems have been solved, the enhanced trace may be created (310).

Figure 6:
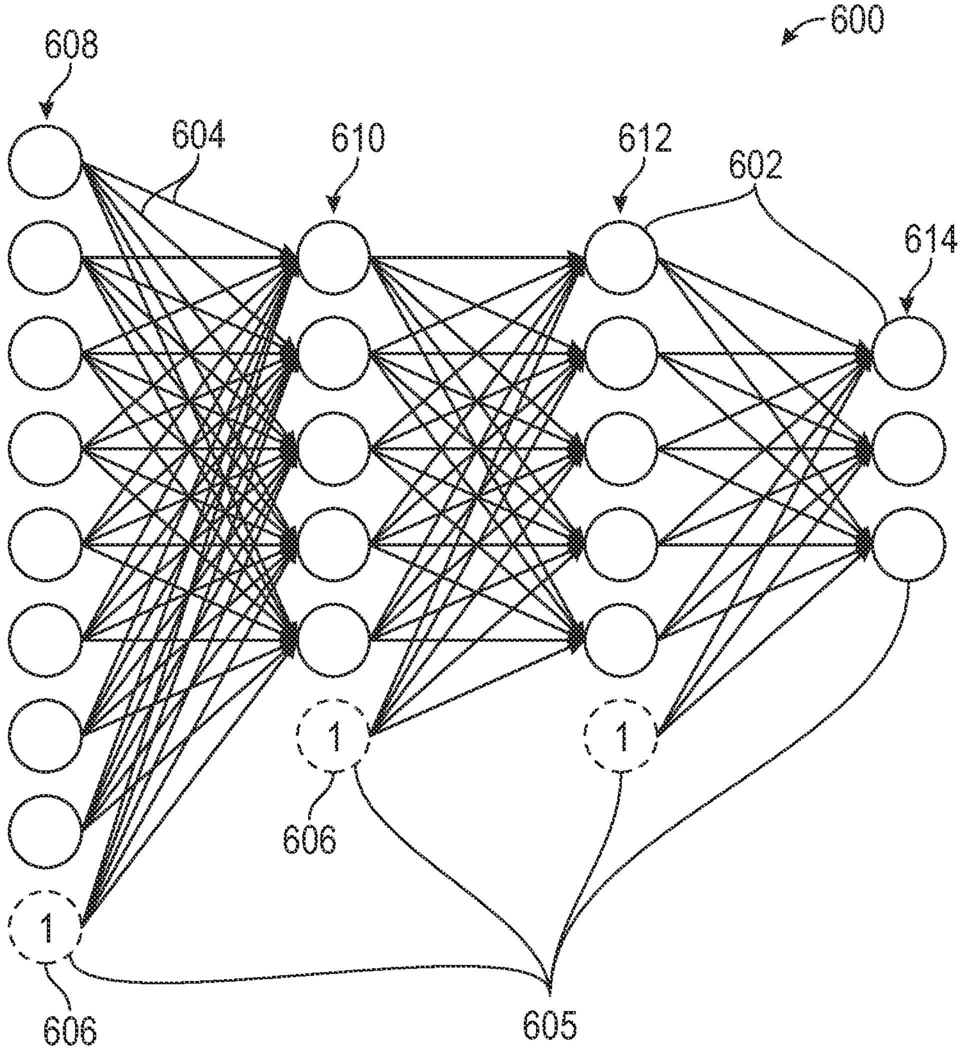
FIG. 6 shows a neural network in accordance with one or more embodiments.

In some embodiments, the machine-learned model is a neural network. A diagram of a neural network is shown in FIG. 6. At a high level, a neural network (600) may be graphically depicted as being composed of nodes (602), where here any circle represents a node, and edges (604), shown here as directed lines. The nodes (602) may be grouped to form layers (605). FIG. 6 displays four layers (608, 610, 612, 614) of nodes (602) where the nodes (602) are grouped into columns, however, the grouping need not be as shown in FIG. 6. The edges (604) connect the nodes (602). Edges (604) may connect, or not connect, to any node(s) (602) regardless of which layer (605) the node(s) (602) is in. That is, the nodes (602) may be sparsely and residually connected. A neural network (600) will have at least two layers (605), where the first layer (608) is considered the "input layer" and the last layer (614) is the "output layer". Any intermediate layer (610, 612) is usually described as a "hidden layer". A neural network (600) may have zero or more hidden layers (610, 612) and a neural network (600) with at least one hidden layer (610, 612) may be described a "deep" neural network or a "deep learning method". As such, in some embodiments, the machine-learned model is a deep neural network. In general, a neural network (600) may have more than one node (602) in the output layer (614). In this case the neural network (600) may be referred to as a "multi-target" or "multi-output" network.

Nodes (602) and edges (604) carry additional associations. Namely, every edge is associated with a numerical value. The edge numerical values, or even the edges (604) themselves, are often referred to as "weights" or "parameters". While training a neural network (600), numerical values are assigned to each edge (604). Additionally, every node (602) is associated with a numerical variable and an activation function. Activation functions are not limited to any functional class, but traditionally follow the form $$A = f\left(\sum_{i\in(incoming)} [(\text{node value})_i\,(\text{edge value})_i]\right), \tag{4}$$

where i is an index that spans the set of "incoming" nodes (602) and edges (604) and f is a user-defined function. Incoming nodes (602) are those that, when viewed as a graph (as in FIG. 6), have directed arrows that point to the node (602) where the numerical value is being computed. Some functions for $f$ may include the linear function $f(x)=x$, sigmoid function $$f(x) = \frac{1}{1+e^{-x}},$$

and rectified linear unit function $f(x)=\max(0, x)$, however, many additional functions are commonly employed. Every node (602) in a neural network (600) may have a different associated activation function. Often, as a shorthand, activation functions are described by the function $f$ by which it is composed. That is, an activation function composed of a linear function $f$ may simply be referred to as a linear activation function without undue ambiguity.

When the neural network (600) receives an input, the input is propagated through the network according to the activation functions and incoming node (602) values and edge (604) values to compute a value for each node (602). That is, the numerical value for each node (602) may change for each received input. Occasionally, nodes (602) are assigned fixed numerical values, such as the value of 1, that are not affected by the input or altered according to edge (604) values and activation functions. Fixed nodes (602) are often referred to as "biases" or "bias nodes" (606), displayed in FIG. 6 with a dashed circle.

In some implementations, the neural network (600) may contain specialized layers (605), such as a normalization layer, or additional connection procedures, like concatenation. One skilled in the art will appreciate that these alterations do not exceed the scope of this disclosure.

As noted, the training procedure for the neural network (600) comprises assigning values to the edges (604). To begin training the edges (604) are assigned initial values. These values may be assigned randomly, assigned according to a prescribed distribution, assigned manually, or by some other assignment mechanism. Once edge (604) values have been initialized, the neural network (600) may act as a function, such that it may receive inputs and produce an output. As such, at least one input is propagated through the neural network (600) to produce an output. Recall, that a given data set will be composed of inputs and associated target(s), where the target(s) represent the "ground truth", or the otherwise desired output. The neural network (600) output is compared to the associated input data target(s). The comparison of the neural network (600) output to the target(s) is typically performed by a so-called "loss function"; although other names for this comparison function such as "error function" and "cost function" are commonly employed. Many types of loss functions are available, such as the mean squared error function, however, the general characteristic of a loss function is that the loss function provides a numerical evaluation of the similarity between the neural network (600) output and the associated target(s). The loss function may also be constructed to impose additional constraints on the values assumed by the edges (604), for example, by adding a penalty term, which may be physics-based, or a regularization term. Generally, the goal of a training procedure is to alter the edge (604) values to promote similarity between the neural network (600) output and associated target(s) over the data set. Thus, the loss function is used to guide changes made to the edge (604) values, typically through a process called "backpropagation".

While a full review of the backpropagation process exceeds the scope of this disclosure, a brief summary is provided. Backpropagation consists of computing the gradient of the loss function over the edge (604) values. The gradient indicates the direction of change in the edge (604) values that results in the greatest change to the loss function. Because the gradient is local to the current edge (604) values, the edge (604) values are typically updated by a "step" in the direction indicated by the gradient. The step size is often referred to as the "learning rate" and need not remain fixed during the training process. Additionally, the step size and direction may be informed by previously seen edge (604) values or previously computed gradients. Such methods for determining the step direction are usually referred to as "momentum" based methods.

Once the edge (604) values have been updated, or altered from their initial values, through a backpropagation step, the neural network (600) will likely produce different outputs. Thus, the procedure of propagating at least one input through the neural network (600), comparing the neural network (600) output with the associated target(s) with a loss function, computing the gradient of the loss function with respect to the edge (604) values, and updating the edge (604) values with a step guided by the gradient, is repeated until a termination criterion is reached. Common termination criteria are: reaching a fixed number of edge (604) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (604) values are no longer intended to be altered, the neural network (600) is said to be "trained".

In another embodiment, the machine-learned model is a convolutional neural network (CNN). A CNN is similar to a neural network (600) in that it can technically be graphically represented by a series of edges (604) and nodes (602) grouped to form layers. However, it is more informative to view a CNN as structural groupings of weights; where here the term structural indicates that the weights within a group have a relationship. CNNs are widely applied when the data inputs also have a structural relationship, for example, a spatial relationship where one input is always considered "to the left" of another input. A structural grouping, or group, of weights is herein referred to as a "filter". The number of weights in a filter is typically much less than the number of inputs. In a CNN, the filters can be thought as "sliding" over, or convolving with, the inputs to form an intermediate output or intermediate representation of the inputs which still possesses a structural relationship. Like unto the neural network (600), the intermediate outputs are often further processed with an activation function. Many filters may be applied to the inputs to form many intermediate representations. Additional filters may be formed to operate on the intermediate representations creating more intermediate representations. This process may be repeated as prescribed by a user. There is a "final" group of intermediate representations, wherein no more filters act on these intermediate representations. Generally, the structural relationship of the final intermediate representations is ablated; a process known as "flattening". The flattened representation is usually passed to a neural network (600) to produce the final output. Note, that in this context, the neural network (600) is still considered part of the CNN. Like unto a neural network (600), a CNN is trained, after initialization of the filter weights, and the edge (604) values of the internal neural network (600), if present, with the backpropagation process in accordance with a loss function.

While multiple embodiments using different machine-learned models have been suggested, one skilled in the art will appreciate that this process, of assisting the maximization of the objective function in the NLBF procedure, is not limited to the listed machine-learned models. Machine-learned models such a random forest, or non-parametric methods such a K-nearest neighbors or a Gaussian process may be readily inserted into this framework and do not depart from the scope of this disclosure.

Figure 7:
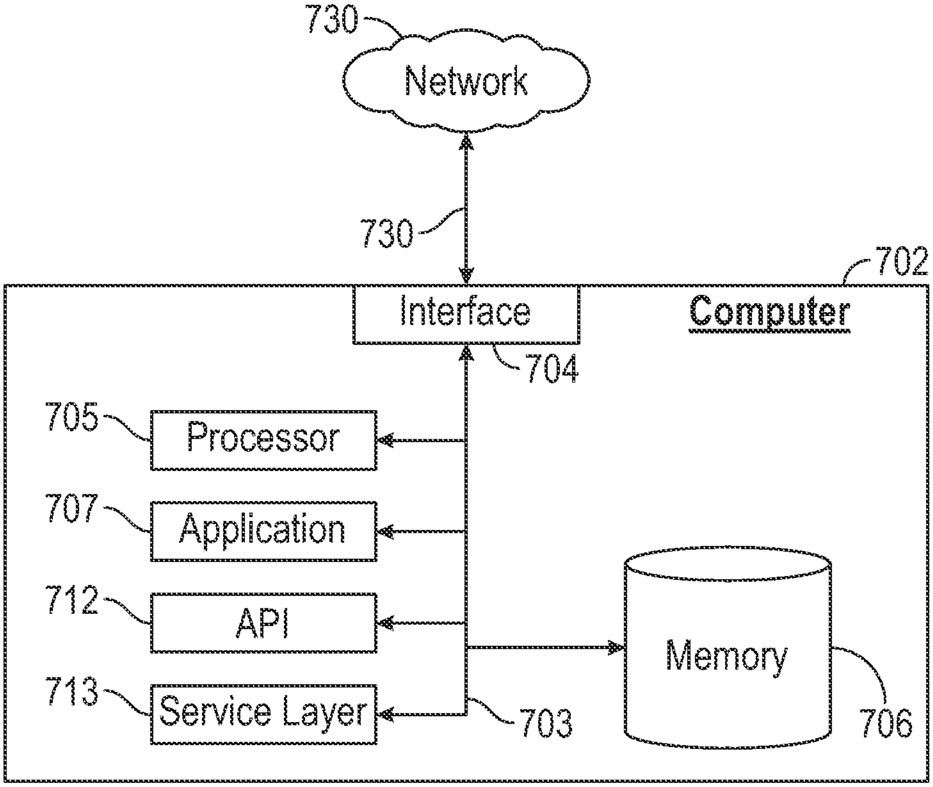
FIG. 7 shows a computer system in accordance with one or more embodiments.

FIG. 7 further depicts a block diagram of a computer system (702) used to provide computational functionalities associated with described algorithms, methods, functions, processes, flows, and procedures as described in this disclosure, according to one or more embodiments. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or another suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704) includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). The memory may be a non-transitory computer readable medium. For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), wherein each computer (702) communicates over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

While the various blocks in FIG. 3, FIG. 4, and FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method comprising:

receiving a seismic data set;

discretizing the seismic data set into a plurality of non-linear beamforming (NLBF) sub-problems;

solving a subset of the NLBF sub-problems with a non-linear optimizer creating a first set of final NLBF tuples corresponding to the subset and storing the first set of final NLBF tuples;

training a machine-learned model with the subset of the NLBF sub-problems and the first set of final NLBF tuples;

obtaining an intermediate NLBF tuple prediction from the trained machine-learned model for a NLBF sub-problem not in the subset;

using, for the NLBF sub-problem not in the subset, the intermediate NLBF tuple prediction as an initial value in the non-linear optimizer to create a final NLBF tuple or accepting the intermediate NLBF tuple prediction obtained directly from the trained machine-learned model as the final NLBF tuple;

storing the final NLBF tuple with the first set of final NLBF tuples;

determining a non-linear beamformed data set with enhanced traces based on the final NLBF tuples;

forming a seismic image based on the non-linear beamformed data set; and planning and drilling a wellbore based on the seismic image.

2. The method of claim 1, further comprising electing of a move-out function and electing an objective function.

3. The method of claim 2, wherein the move-out function is a second-order expansion.

4. The method of claim 1, wherein the machine-learned model is a deep neural network.

5. The method of claim 1, wherein the machine-learned model is trained periodically and a frequency of the periodic training of the machine-learned model is determined by a training scheduler.

6. The method of claim 1, wherein the machine-learned model is trained by optimizing a semblance-like objective function.

7. The method of claim 1, wherein the intermediate NLBF tuple prediction is accepted based on a comparative analysis with a calculated semblance-like value.

8. The method of claim 1, wherein the final NLBF tuples are stored in a data storage system.

9. A non-transitory computer readable medium storing instructions executable by a computer processor, the instructions comprising functionality for:

receiving a seismic data set;

discretizing the seismic data set into a plurality of non-linear beamforming (NLBF) sub-problems;

solving a subset of the NLBF sub-problems with a non-linear optimizer creating a first set of final NLBF tuples corresponding to the subset and storing the first set of final NLBF tuples;

training a machine-learned model with the subset of the NLBF sub-problems and the first set of final NLBF tuples;

obtaining an intermediate NLBF tuple prediction from the trained machine-learned model for a NLBF sub-problem not in the subset;

using, for the NLBF sub-problem in the subset, the intermediate NLBF tuple prediction as an initial value in the non-linear optimizer to create a final NLBF tuple or accepting the intermediate NLBF tuple prediction obtained directly from the trained machine-learned model as the final NLBF tuple;

storing the final NLBF tuple with the first set of final NLBF tuples;

determining a non-linear beamformed data set with enhanced traces based on the final NLBF tuples; and forming a seismic image based on the non-linear beamformed data set, wherein a wellbore is planned and drilled based on the seismic image.

10. The non-transitory computer readable medium of claim 9, the instructions further comprising instructions for electing of a move-out function and electing an objective function.

11. The non-transitory computer readable medium of claim 10, wherein the move-out function is a second-order expansion.

12. The non-transitory computer readable medium of claim 9, wherein the machine-learned model is a deep neural network.

13. The non-transitory computer readable medium of claim 9, wherein the machine-learned model is trained periodically and a frequency of the periodic training of the machine-learned model is determined by a training scheduler.

14. The non-transitory computer readable medium of claim 9, wherein the machine-learned model is trained by optimizing a semblance-like objective function.

15. The non-transitory computer readable medium of claim 9, wherein the intermediate NLBF tuple prediction is accepted based on a comparative analysis with a calculated semblance-like value.

16. The non-transitory computer readable medium of claim 9, wherein the final NLBF tuples are stored in a data storage system.

17. A system, comprising:

a seismic source configured to generate a radiated seismic wave;

a plurality of seismic receivers each configured to sense the radiated seismic wave having propagated through a subsurface as a seismic trace; and a computer system comprising one or more computer processors and a memory, wherein the computer system is configured to:

receive a seismic data set comprising a plurality of seismic traces as sensed by the plurality of seismic receivers;

discretize the seismic data set into a plurality of non-linear beamforming (NLBF) sub-problems;

solve, with a non-linear optimizer, a subset of the NLBF sub-problems creating a first set of final NLBF tuples corresponding to the subset;

store, in the memory, the first set of final NLBF tuples;

train a machine-learned model with the subset of the NLBF sub-problems and the first set of final NLBF tuples;

execute the trained machine-learned model on a NLBF sub-problem not in the subset to obtain an intermediate NLBF tuple prediction;

use, for the NLBF sub-problem not in the subset, the intermediate NLBF tuple prediction as an initial value in the non-linear optimizer to create a final NLBF tuple or accept the intermediate NLBF tuple prediction obtained directly from the trained machine-learned model as the final NLBF tuple;

store, in the memory, the final NLBF tuple with the first set of final NLBF tuples;

determine a non-linear beamformed data set with enhanced traces based on the final NLBF tuples; and form a seismic image based on the non-linear beamformed data set, wherein a wellbore is planned and drilled in the subsurface based on the seismic image.

18. The system of claim 17, wherein the machine-learned model is trained, by the computer system, periodically, and a frequency of the periodic training of the machine-learned model is determined by a training scheduler.

19. The system of claim 17, wherein the machine-learned model is trained by optimizing a semblance-like objective function.

20. The system of claim 17, wherein the intermediate NLBF tuple prediction is accepted based on a comparative analysis with a calculated semblance-like value.

* * * * *